(12) United States Patent
Okuda (10) Patent No.: US 7,978,362 B2
(45) Date of Patent: Jul. 12, 2011

(54) IMAGE FORMING APPARATUS FOR PRINTING IMAGE DATA IN REMOVABLE STORAGE

(75) Inventor: Masaya Okuda, Chuo-ku (JP)

(73) Assignee: Kyocera Mita Corporation, Osaka (JP)

( * ) Notice: Subject to any disclaimer, the term of this patent is extended or adjusted under 35 U.S.C. 154(b) by 1139 days.

(21) Appl. No.: 11/727,965

(22) Filed: Mar. 29, 2007

(65) Prior Publication Data
US 2007/0229899 A1    Oct. 4, 2007

(30) Foreign Application Priority Data

Mar. 29, 2006    (JP) ................................ 2006-089847
Mar. 29, 2006    (JP) ................................ 2006-089848

(51) Int. Cl.
*G06K 15/00* (2006.01)
(52) U.S. Cl. .................... 358/1.16; 358/1.13; 358/1.14; 358/1.15; 707/999.007; 715/256
(58) Field of Classification Search ............... 358/1.13, 358/1.15, 1.9, 1.16, 1.14, 1.18, 1.1, 538, 358/518; 382/100, 276, 294; 369/47.12; 715/201, 239, 256, 737, 744, 751; 707/999.07
See application file for complete search history.

(56) References Cited

U.S. PATENT DOCUMENTS

| | | | | |
|---|---|---|---|---|
| 6,774,980 B2 * | 8/2004 | Hoshino et al. | .................. | 355/40 |
| 6,820,094 B1 * | 11/2004 | Ferguson et al. | ..................... | 1/1 |
| 7,185,011 B1 * | 2/2007 | Dujari | ..................... | 1/1 |
| 7,423,782 B2 * | 9/2008 | Miyazawa et al. | ............. | 358/2.1 |
| 7,539,698 B2 * | 5/2009 | Sakaniwa et al. | ..................... | 1/1 |
| 7,733,521 B1 * | 6/2010 | Cavill et al. | ..................... | 358/1.9 |
| 2001/0045966 A1 * | 11/2001 | Inoue et al. | ........................ | 347/3 |
| 2003/0184801 A1 | 10/2003 | Murata | | |
| 2003/0231343 A1 * | 12/2003 | Kobayashi et al. | ........... | 358/1.16 |
| 2006/0018223 A1 * | 1/2006 | Ji et al. | ......................... | 369/47.12 |
| 2006/0050298 A1 * | 3/2006 | Yun | ............................... | 358/1.15 |
| 2007/0222802 A1 * | 9/2007 | Yoshida | ............................ | 347/5 |
| 2007/0223013 A1 * | 9/2007 | Mizutani | ........................ | 358/1.2 |
| 2008/0303823 A1 * | 12/2008 | Yanagawa | ..................... | 345/467 |

FOREIGN PATENT DOCUMENTS

| | | |
|---|---|---|
| JP | 08099451 A | 4/1996 |
| JP | 2002223379 A | 8/2002 |
| JP | 2002254758 A | 9/2002 |
| JP | 2003069926 A | 3/2003 |
| JP | 2005-349664 | 12/2005 |
| JP | 2007253572 A | 10/2007 |
| KR | 10-2006-0023780 | 3/2006 |

* cited by examiner

*Primary Examiner* — Twyler L Haskins
*Assistant Examiner* — Dennis Dicker
(74) *Attorney, Agent, or Firm* — Browdy and Neimark, PLLC

(57) ABSTRACT

The contents of a print-file-selection settings file "SELF-L.TXT" have folder path "/FLD1" and print attribute settings file path "/PTYFL.TXT" which are provided to print file decision section and file detection section, respectively. The print file decision section successively provides the contents of each of PDF files in folder "FLD1" to bitmap conversion section. The file detection section reads the contents of "PTYFL.TXT", provides print attribute values to bitmap conversion section, and print control values to printer. The bitmap conversion section converts the contents of a PDF file into one in PDL, further into bitmap format, and sends it to the printer. Alternatively, the number of characters N of each filenames to be displayed is obtained, the number of files M whose N exceeds N0 is counted, and if this exceeds M0, all the filenames together with their file IDs are automatically printed.

2 Claims, 7 Drawing Sheets

SELFL.TXT

/FLD1
/PTYFL.TXT

FIG.3B

PTYFL.TXT

PrintPaperSize:A4
PaperSource:Auto
Orientation:Portrate
NumberOfCopys:1
2-SidePrinting:None
Staple:None

FIG.3C

SELFL.TXT

/FLD1
.PDF,.DOC
/PTYFL.TXT

```
                        -1/1-
           List of Partitions              2006.03.12
00:ABC.pdf
01:Request for Examination 06-02037-EP 2006-03-10.pdf
02:Request for Examination 06-02037-KR 2006-03-11.pdf
03:Annual Fee 3rd Year 04-03523 DE 2006-03-08.pdf
04:Annual Fee 3rd Year 04-03523 GB 2006-03-08.pdf
05:Annual Fee 3rd Year 04-03523 FR 2006-03-08.pdf
```

*FIG.7*

IMAGE FORMING APPARATUS FOR PRINTING IMAGE DATA IN REMOVABLE STORAGE

CROSS-REFERENCE TO RELATED APPLICATIONS

This application is based upon and claims the benefit of priority from the prior Japanese Patent Application No. 2006-089847 and 2006-089848, filed on Mar. 29, 2006, the entire contents of which are incorporated herein by reference.

TECHNICAL FIELD

The present invention generally relates to an image forming apparatus for forming images on a sheet based on data, and in particular to an image forming apparatus for printing data of a file stored in a removable memory device such as a USB (Universal Serial Bus) flash memory.

BACKGROUND OF THE INVENTION

JP No. 2005-349664-A discloses a configuration wherein on detecting that memory card is inserted into a slot, a list thereof is displayed, a selection of the data files by a user is accepted if convertible data files are stored, the selected data files are converted into print data, and then the images thereof are formed on sheets of paper.

According to this configuration, it is possible to have the contents of files printed by an image forming apparatus not connected to a network, and in addition, it is possible to prevent eavesdropping from communication media, as well as information leakage due to an incorrect address specification of the image forming apparatus.

However, in particular, in a case where there are a plurality of data files to be printed, since a user needs repeatedly to select data files, set print attributes, and press the start switch several times, it is complicated.

In addition, in a case where a user selects data files as print targets on a small image forming apparatus, the number of displayable characters on one line of the control panel is, for example, 19 characters, which is so short that if the filename is long, only part of it can be displayed. In a case where only the common portions of a plurality of filenames are displayed, it is unclear which file should be selected as the print target. Although it is possible to use the directional keys to move the displayed characters to display the missing portions, it is troublesome in a case where it is necessary to repeat this for a plurality of files.

SUMMARY OF THE INVENTION

Accordingly, an object of the present invention is to provide an image forming apparatus capable of easily and rapidly printing data files stored in a removable memory device.

Another objective of the present invention is to provide an image forming apparatus capable of easily selecting a print target file, even if part of the file name is missing because displayable characters per row on a control panel are so few in number.

In one aspect of an image forming apparatus according to the present invention, a program causes a processor: (a) if detection means detects that a removable memory device is coupled to coupling means, in response to the detection, to determine whether a prescribed file is stored in the removable memory device; and (b) if the determination is positive, to read the contents of a prescribed file, to convert the contents into bitmapped data, and to provide the bitmapped data to the image formation means.

According to this configuration, just by storing the prescribed files in the removable memory device and mounting this on the image forming apparatus, the prescribed files can be automatically printed; in particular, this achieves the effect of enabling easy and rapid printing of a plurality of files.

In another aspect of the image forming apparatus in the present invention, a program causes a processor: (a) if the removable memory device is coupled to the coupling means, then according to an instruction input from instruction input means, to display the name of a prescribed type of files stored in the removable memory device, together with their identification codes added to the beginning of the names, within the number of characters that can be displayed in one row on display means; (b) according to an instruction input from the instruction input means, to provide data including the names of the prescribed type of files stored in the removable memory device and their identification codes, to the image formation means to print a file list on a sheet of paper; and (c) to read the contents of a file selected by a instruction input from the instruction input means, to convert the contents into print data, and to provide the print data to the image formation means.

According to this configuration, even if parts of the filenames become missing from the display screen because one row on the display means is insufficient to display the full name of files, resulting in only the common part of a plurality of filenames being displayed on the display means, by looking at the file list, and determining the identification codes of the print targets, the effect is achieved of enabling easy selection of the print target files.

Other aspects, objects, and the advantages of the present invention will become apparent from the following detailed description taken in connection with the accompanying drawings.

DESCRIPTION OF THE PREFERRED EMBODIMENTS

Referring now to the drawings, wherein like reference characters designate like or corresponding parts throughout several views, preferred embodiments of the present invention will be described below.

First Embodiment

Figure 7:
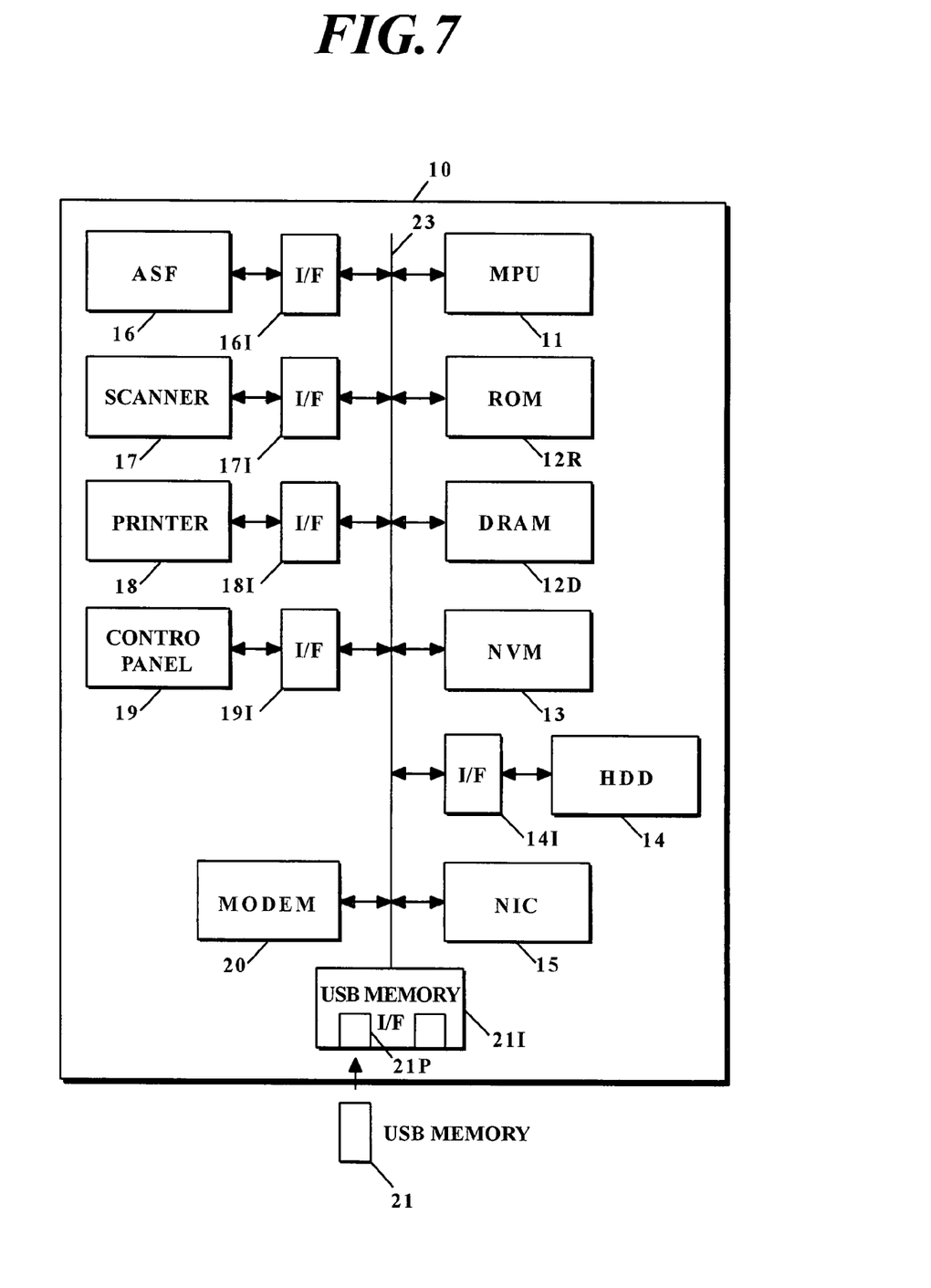
FIG. 7 is a schematic block diagram of the hardware of an image forming apparatus.

FIG. 7 is a schematic block diagram of the hardware of an image forming apparatus 10 of a first embodiment according to the present invention.

In this image forming apparatus 10, MPU (Micro Processing Unit) 11, ROM 12R, DRAM 12D, NV-Memory (Non-Volatile Memory) 13, NIC (Network Interface Card) 15, modem 20, and interfaces 14I, 16I-19I, and 21I are mutually coupled through bus 23. Hard disk drive (HDD) 14, auto sheet feeder 16, scanner 17, printer 18 and control panel 19 are coupled to the interface 14I and 16I-19I, respectively.

In the ROM 12R, a boot-strap, an operating system (OS), an application that operates at the upper layer of the OS, and various device drivers (including a driver that access USB memory 21 through the interface 21I) that operate at the lower layer of the OS are stored. The application operates for making the image forming apparatus 10 function as multi-function peripherals, and these functions include copying, scanning, printing, and faxing.

The DRAM 12D is used as a main memory. The NV-memory 13, for example, flash memory, is electrically rewritable, and stores default print attribute values, and values changed through the control panel 19.

The NIC 15 is coupled to personal computers on a network, and is used for print jobs. The scanner 17 works together with the auto-feeder 16 to input images, and is used for copying jobs and faxing jobs. The printer 18 comprises a print engine, a fixing assembly, and a paper feeder, paper carriers and an output tray; and based on bitmapped data provided as print data, forms an electrostatic latent image on the light-sensitive drum of the print engine, then develops this with toner, transfers it to a sheet of paper, fixes it on the sheet of paper, and feeds it to the output tray. The Operation panel 19 comprises a display part and an input part of keys, which are for inputting setting information or instructions and for displaying such as a selection screen or a setting one. The modem 20 is for sending or receiving facsimiles. The USB memory interface 21I comprises a port 21P to which removable USB memory 21 can be freely attached or removed. The USB memory 21 is electrically rewritable non-volatile memory and comprises a flash memory chip for example.

Next, processing by a file automatic printing program which is a part of the above-described application, is described.

Figure 1:
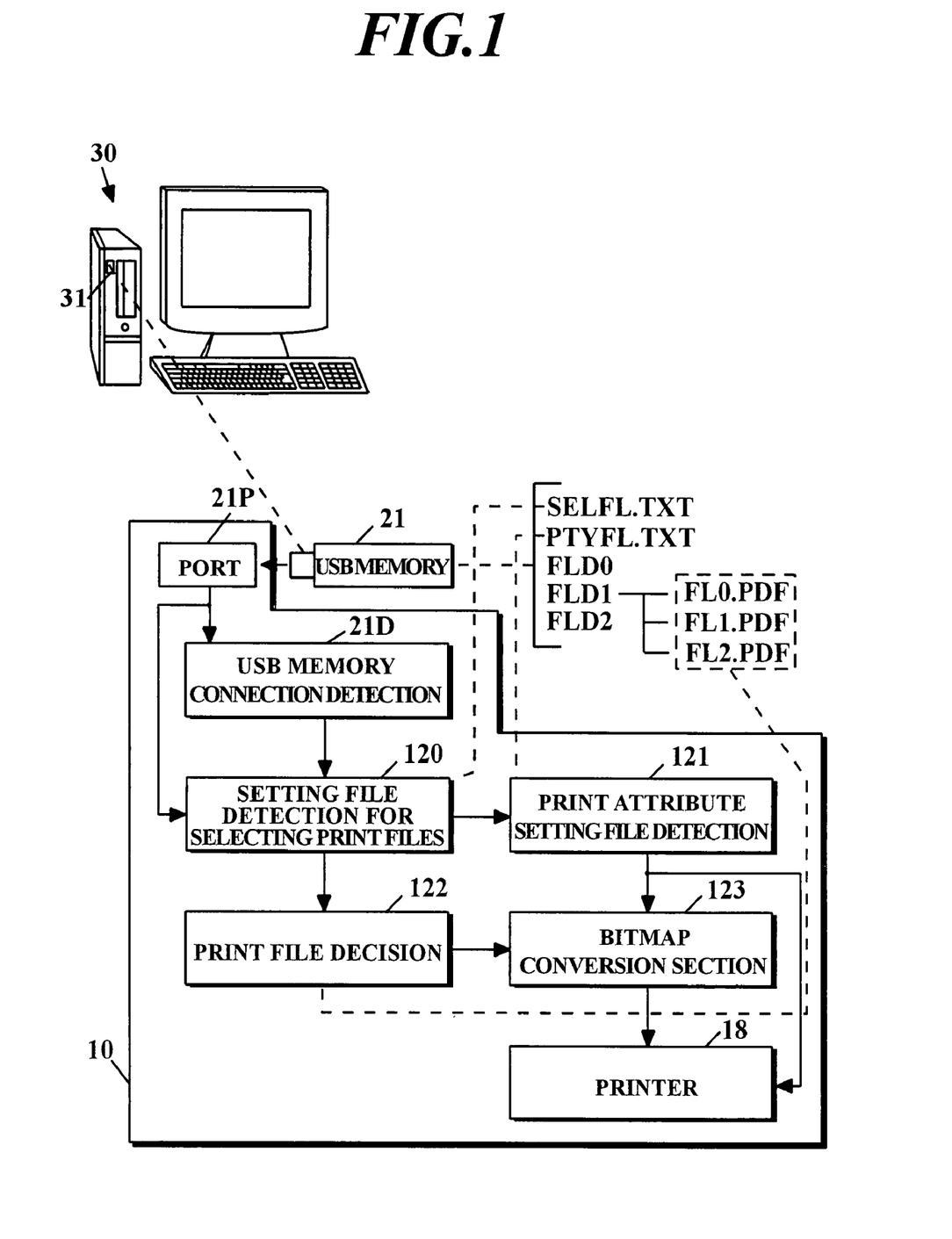
FIG. 1 is a schematic functional block diagram depicting related parts of hardware and software of an image forming apparatus according to a first embodiment of the present invention.

FIG. 1 is a schematic functional block diagram depicting the parts of the hardware and software of the image forming apparatus 10 according the present invention.

Figure 3A:
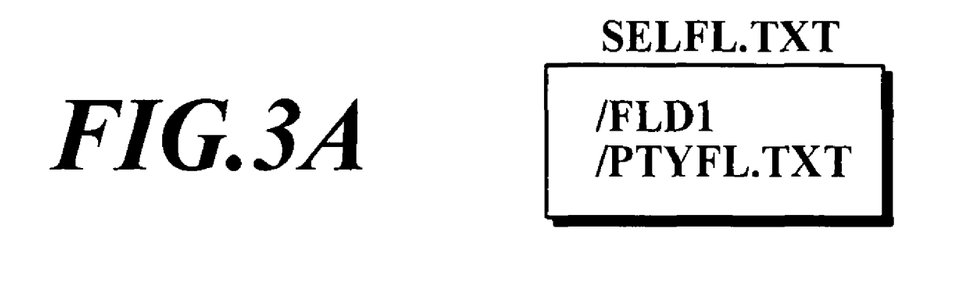
FIGS. 3A to 3C are illustrations of the contents of a print file selection settings file SELFL.TXT and a print attribute settings file PTYFL.TXT in FIG. 1.
Figure 3B:
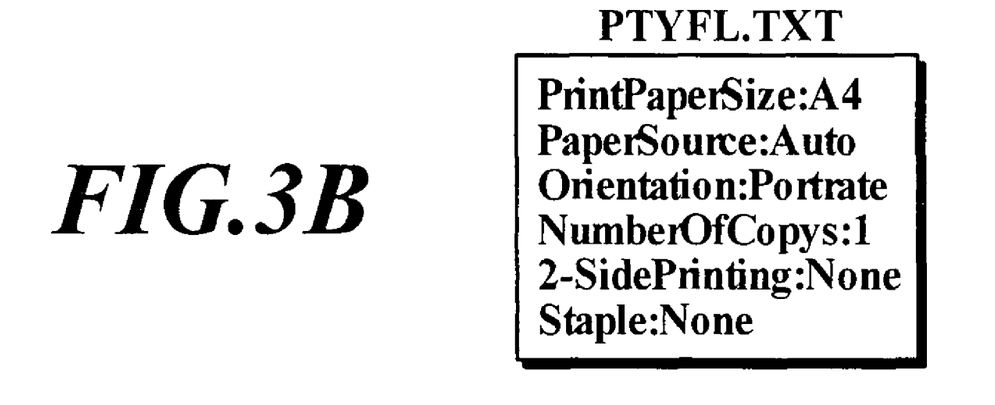

User firstly attaches the USB memory 21 to the port 31 of the personal computer 30, and stores PDF (Portable Document Format) files to be printed in the USB memory 21. For example, in the USB memory 21, there are created folders FLD0, FLD1 and FLD2; and the files to be printed, FLD0.PDF, FLD1.PDF and FLD2.PDF, are stored in this folder FLD1. In addition, print-file selection setting file SELFL.TXT and print attribute settings file PTYFL.TXT which are respectively described in FIGS. 3A and 3B are created in the personal computer 30, and stored in the USB memory 21. SELFL.TXT is a text file which describes the path of the folder containing the files to be printed (in FIG. 3A, it is /FLD1), as well as the name of the print attribute settings file (in FIG. 3A, it is PTYFL.TXT). The print attribute setting file is a text file which describes a paper size, a paper feed tray, a paper orientation, the number of copies, whether the printing is double-sided or not, and whether the copies are to be stapled or not, as well as other such attributes, according to pre-defined rules. In the present embodiment, these setting files, SELFL.TXT and PTYFL.TXT, are stipulated to be stored in the root folder of the USB memory 21 as indicated in FIG. 1.

This USB memory 21 is pulled out from the port 31 and inserted into the port 21P of the image forming apparatus 10. This insertion is detected by USB memory connection detecting section 21D, and this detection can be carried out by comparing the voltage of the signal terminal of the port 21 with the threshold value. The perception of detecting signals is carried out by interrupt processing or polling at regular intervals. USB memory connection detection section 21D is a part of the USB memory interface 21I in FIG. 7.

Blocks 120-123 are composed of software. The Bitmap conversion section 123 comprises a conversion section and an RIP (Raster Image Processor) section, and the latter may be composed of hardware.

Setting file detection section 120 for selecting print files responds to the detection carried out by the USB memory connection detection section 21D, finds the setting file SELFL.TXT for selecting print files from the root folder of the USB memory 21, reads its contents, and provides the path of the folder /FLD1 and the file /PTYFL.TXT to print file decision section 122 and the print attribute setting file detection section 121, respectively. The print file deciding section 122, upon receiving this, finds the PDF files in the folder FLD1, and successively provides the contents of each file to bitmap conversion section 123. On the other hand, the print attribute setting file detection section 121 reads the contents of the file PTYFL.TXT, provides the attributes of the paper size related to the image orientation and size, as well as the paper orientation and whether the copies are double-sided or not, to the bitmap conversion section 123, and provides the paper size, the paper feed tray, the paper orientation, the number of copies, and whether the copies are double-sided or not, as well as whether the copies are to be stapled or not, to the printer 18.

The bitmap conversion section 123 includes, as the above conversion section, a program to convert the contents of a PDF file to the one described in page description language; thereby, the contents of the PDF file provided by the print file decision section 122 is converted to that written in page description language; in addition, through the RIP section, it is bitmap-converted with taking the above attribute values into account and fed to printer 18. According to above described attribute values, the printer 18 responds to this feeding of the bitmap data and forms an image corresponding to said data on the paper sheet.

Figure 2:
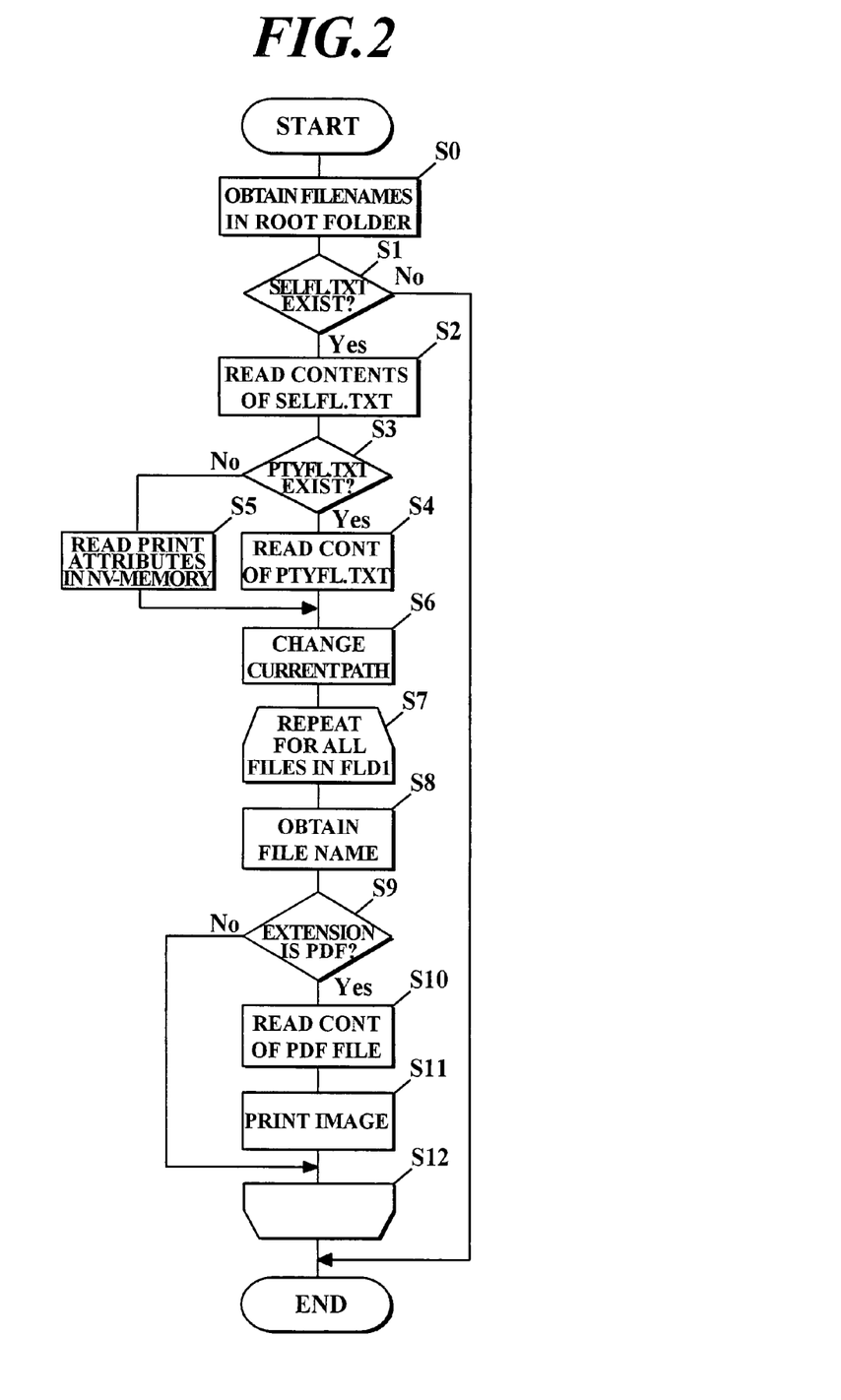
FIG. 2 is a flowchart depicting the details of Blocks 120-123 in FIG. 1.

FIG. 2 is a flowchart depicting the details of the blocks 120-123 in FIG. 1, and this processing is initiated in response to the detection of the connection by the USB memory connection detection section 21D. The labels in parentheses below are symbols representing steps in FIG. 2.

(S0, S1) The names of files included in the root folder in the USB memory 21 are obtained, and if the SELFL.TXT is included among them, then the process proceed to step S2; otherwise, terminate the processing of FIG. 2.

(S2-S5) The contents of the setting file SELFFL.TXT for selection print files are read, and if the path of the print attribute setting file (/PTYFL.TXT in FIG. 3A) is included therein, then the contents of that file is read from USB memory 21; otherwise, the print attributes stored in NV-Memory 13 in FIG. 7 are read.

(S6) The current path is changed to /FLD1 described in the file SELFL.TXT.

In the following, the processing between step S7 and S12 are to be repeated for all files in the folder FLD1.

(S8) One of the file names registered in the folder (directory) FLD1 is obtained.

(S9) If the extension of that file is PDF, the process proceeds to step S10; otherwise, back to step S12, that is, the head of the loop.

(S10, S11) For this file, there is carried out the processing described above of the print attribute settings file detection section 121 and the bitmap conversion section 123.

According to the present first embodiment, in response to the detection at the USB memory connection detection section 21D, it is determined whether the prescribed file (in the present embodiment, it is PDF files) is stored or not in the USB memory 21; if the determination is positive, the contents of said prescribed file is read, and the contents is converted to bitmapped data and fed to the printer 18; thus, just by storing the prescribed file into the USB memory 21 and inserting it into the image forming apparatus 10, the prescribed file can be automatically printed; in particular, this achieves the effect of easily and rapidly printing a plurality of files.

Also, in response to the detection at the USB memory connection detection section 21D, it is determined whether or not the settings file SELFL.TXT for selecting print files is stored in the USB memory 21; if the determination is positive, the contents of this file is read, and based on the contents, the prescribed files are decided; thus, even if there are stored files unrelated to printing in the USB memory 21, it is no need to delete them, and this achieves the effect of exceptional ease of use.

In addition, by including the description of the path of a folder containing files to be printed in the setting file SELFL.TXT for selecting print files, the files that are in the folder and also have the prescribed extension in file name are decided as the prescribed files; in particular when a plurality of files are to be printed, this achieves the effect of easily and rapidly specifying the files to be printed.

Furthermore, it is determined whether or not the path of the print attribute setting file is stored in the USB memory 21; if this determination is positive, the contents of this file are read, and based on said contents, the contents of the prescribed files are converted into bitmap data to form images by the printer 18; therefore, without operating the control panel 19 of the image forming apparatus 10 to set the print attributes, the effect of easily and rapidly printing is achieved.

Further, by storing a plurality of print attribute setting files in the USB memory 21 and specifying one of them in the setting file for selecting print files, the print attribute setting file to be used can be specified, so that the effect of easily and rapidly settings of appropriate print attributes can be achieved.

Second Embodiment

In the above first embodiment, there was described a case of automatically printing for all files with the prescribed extension in the prescribed folder in the USB memory 21, but a configuration is preferable that it is possible to select either this automatic mode or a manual mode. In the second embodiment of the present invention, a case of the manual mode will be explained.

Figure 6A:
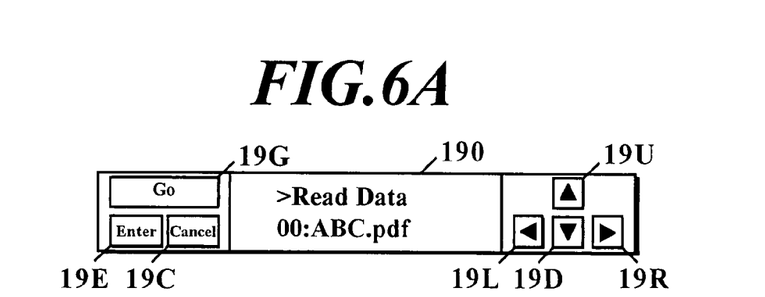
FIGS. 6A to 6C are illustrations of processing in FIG. 4.

In regard to the hardware configuration of an image forming apparatus in a second embodiment, it is identical to the above first embodiment described in FIG. 7. However, the panel 19 of the second embodiment has, as depicted in FIG. 6A, the directional keys of up key 19U, down key 19D, right key 19R and left key 19L arranged to the right of LCD display panel 19O, and Enter key 19E, Cancel key 19C and Go key 19G arranged to the left of the LCD display panel 19O. In this embodiment, the number of displayable characters in the LCD display panel 19O per row is sixteen, and the row is two.

Next, there is described processing by a manual printing program, which is a part of the above application, for files in the USB memory.

Figure 4:
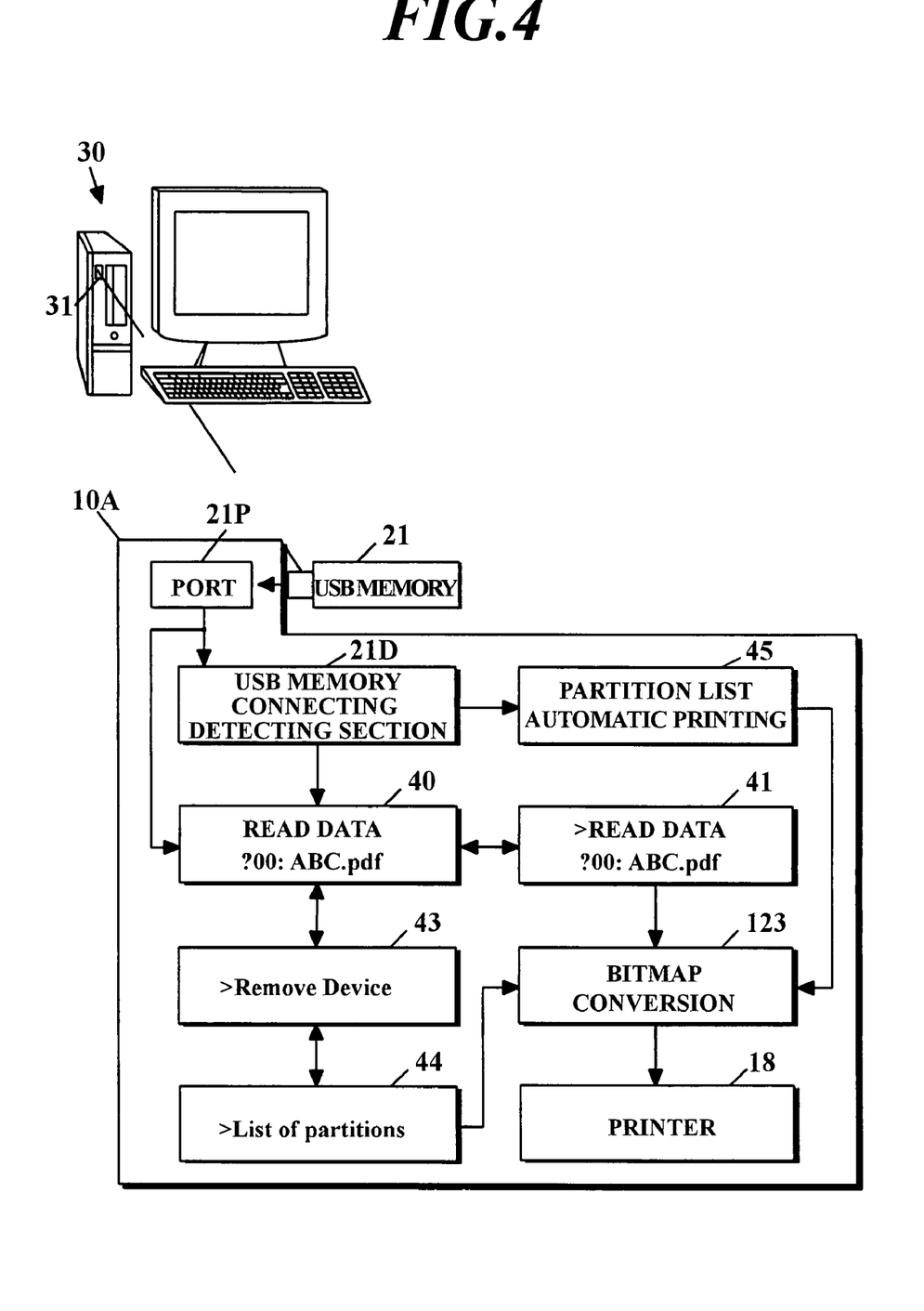
FIG. 4 is a schematic functional block diagram depicting related parts of hardware and software of an image forming apparatus according to a second embodiment of the present invention.

FIG. 4 is a schematic functional block diagram depicting the parts related to said program of the image forming apparatus 10.

Blocks 40-45 are composed of software; each blocks 41 to 44 begins processing in response to key input events in other blocks linked by arrows, and block 40 and 45 begin processing in response to the connection detection at the USB memory connection detection section 21D.

The file-selection reception section 40, in response to the connection detection at USB memory connection detection section 21D, obtains all names of PDF files registered in the prescribed folder in the USB memory 21, which in the present embodiment is the root folder (root directory), and displays the first filename, together with its identification code and the delimiter ':' therebetween. In FIG. 4, '00:ABC.pdf' is displayed. This identification code '00' is the number temporarily associated with a PDF file; in order to display it even if the filename is long, it is added to the beginning part of filename.

Figure 6B:
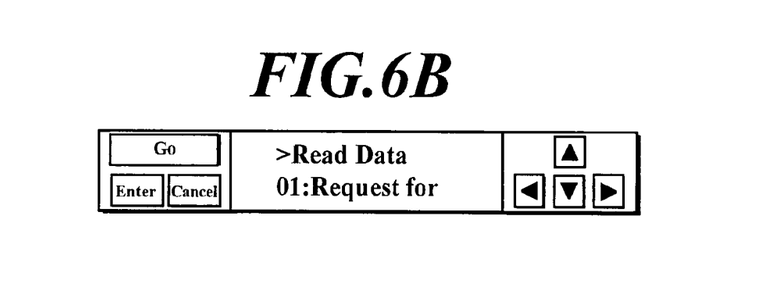
Figure 6C:
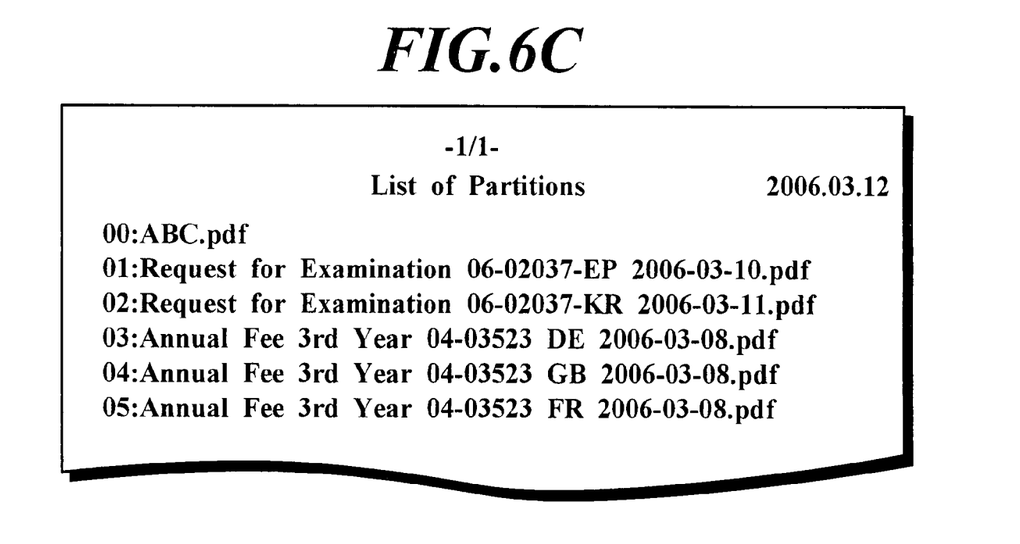

In this status, by depressing the right key 19R, the above-obtained PDF filenames are displayed one by one on the LCD display panel 19O, and the identification codes sequentially incremented are added to these and displayed together with. Also, each time the left key 19L is depressed, the previous PDF filename is displayed together with its identification code. FIG. 6C depicts a concrete example of a correspondence between identification codes and PDF filenames.

While a print target filename is being displayed, if the Enter key 19E is depressed, processing of file print reception section 41 begins; and '?' is displayed on the front side of the identification code, which indicates this file was selected. In this status, if the Go key 19G is depressed, by the file printing reception section 41, the contents of the selected file are read from the USB memory 21, provided to the bitmap conversion section 123, and the same processing as in the case of the above first embodiment is carried out.

In the file-selection reception section 40, if the down key 19D is depressed, the processing of memory removable reception section 43 begins. In this situation, if the Enter key 19E is depressed, the USB memory 21 becomes in a state where it can be safely pulled out from port 21P.

Here, as illustrated in FIG. 6C, when any of identification codes 01-05 is displayed on the LCD display panel 19O, the filename which lacks a part is displayed. FIG. 6B depicts a situation that a part of the filename associated with identification code 01 is displayed. As illustrated in FIG. 6C, regarding identification codes 01 and 02, since part of the filenames in common is displayed, it is unclear which one should be the printing target.

In this kind of situations, depressing the down key 19D in the state where the memory removable reception section 43 is switching to its processing, make the processing of partition list manual print reception section 44 to begin. In this state, by pressing the Go key 19G, the all text data of the filenames described above is provided to the bitmap conversion section 123. The bitmap conversion section 123 converts this text data to a bitmap format and provides it to the printer 18. Thus, a partition (file) list as depicted in FIG. 6C is printed.

By viewing this list, user can decide which of identification codes 01 and 02 to select. For example, in order to select identification code 02 as the print target, in the situation depicted in FIG. 6B, the user depresses the right key 19R once to display the filename for the identification code 02; and in the same manner as above, depresses the Enter key 19E to select the file in this state, and next, depresses the Go key 19G to print the contents of that file by the printer 18E.

Figure 5:
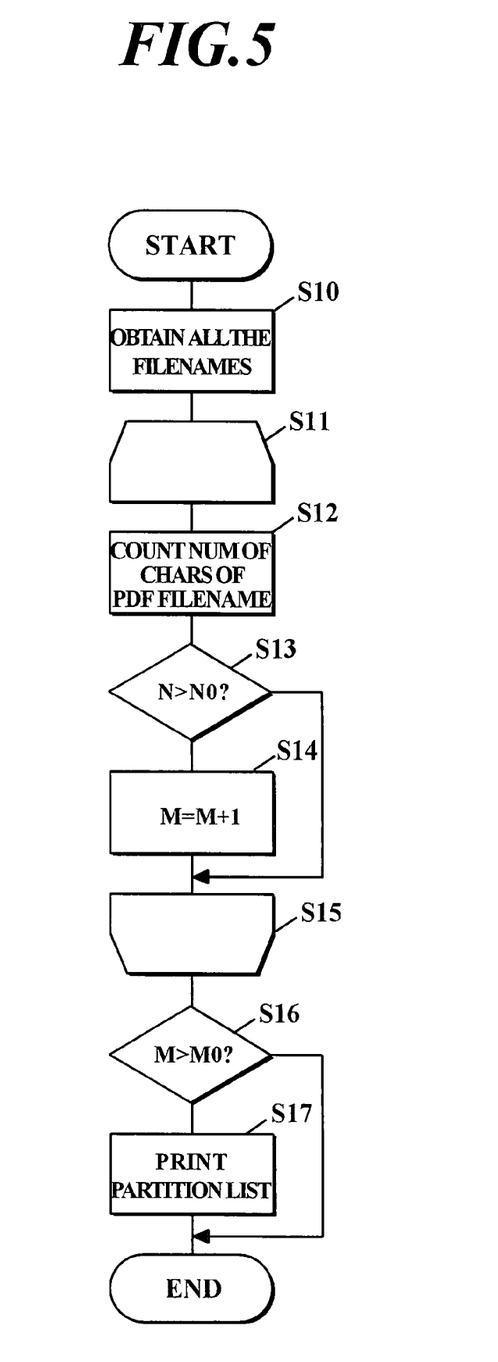
FIG. 5 is a flowchart depicting the details of a block partition list automatic printing section in FIG. 4.

FIG. 5 is a flowchart depicting the processing at partition list automatic printing section 45 shown in FIG. 4. This processing begins in response to connection detection at the USB memory connection detection section 21D. In the following, characters in parentheses are step identification codes in FIG. 5.

(S10) All the filenames are obtained registered in the root directly in the USB memory 21. In the following, the processing between step 11 and step 15 is repeated for all the PDF files.

(S12) The number N is counted of characters of a PDF filename.

(S13, S14) If N is greater than N0, the number of files M is incremented by one. The character count threshold value N0 is stored in NV-Memory 13, and the default value is, for example, fifteen.

(S16, S17) If M is greater than M0, the partition list as shown in FIG. 6C is printed in the same manner as described above. The threshold for the number of files M0 is stored in NV-Memory 13, and the default value is, for example, three.

The above threshold values N0 and M0 can be set by operating the control panel 19.

According to the present second embodiment, in response to the instructions input from the control panel 19, as many characters of the name of the PDF files stored in the USB memory 21 as the prescribed displayable number of characters in one row are displayed on the control panel 19, together with the identification code added to the front part of said filename; in response to the instructions from the control panel 19, the list of PDF files stored in USB memory 21 is printed on paper; thus, even if the displayable number of characters in one row on the LCD panel 190 is insufficient to display the full name of files and only the parts in common of a plurality of filenames are displayed on the LCD panel 190, by viewing said list of files and deciding the identification code for the print target, the effect of easily selecting a file as the print target can be achieved.

Also, the number of characters N is obtained for each name of the files to be displayed, the number of files M whose N exceeds a threshold N0 is counted, and if this number exceeds a threshold M0, then the list of all the filenames to be displayed, together with their identification codes, is automatically printed; thus, the effect of eliminating user's intervention and even more easily selecting a file as the print target can be achieved.

In addition, since the thresholds N0 and M0 can be set, the effect of setting the conditions for automatic printing of the file list according to users is also achieved.

Although preferred embodiments of the present invention have been described, it is to be understood that the invention is not limited thereto and that various changes and modifications may be made without departing from the spirit and scope of the invention.

Figure 3C:
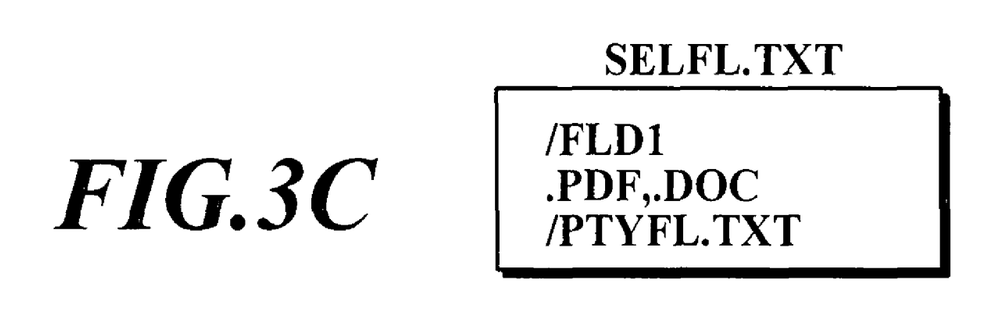

For example, in the above first embodiment, a case where only PDF files could be printed automatically was described, but it is sufficient if there is a type of files which is printable by the image forming apparatus 10; if there are a plurality of files of this type, as depicted in FIG. 3C for example, listing the file's extensions in the SELFL.TXT, and then using this as the prescribed extension for the determination in Step S9, is also acceptable as a configuration of the present invention.

Also, such a configuration may be as directly specifying the names of the print targets in the setting file SELFL.TXT, or not specifying any filenames and thus setting all the PDF files in the root directory as print targets.

In addition, such a configuration may be as inserting the contents of the setting file PTYFL.TXT into the setting file SELFL.TXT and putting the two into a single document.

Further, such a configuration may be as storing the contents of either one or both of the setting file SELFL.TXT and the PTYFL.TXT into the NV-Memory 13 or the hard disk 14 in FIG. 7, and then reading the contents at Steps S0 and Step S2.

Furthermore, in a case where these files exist in both the USB memory 21 and the NV-Memory 13 or the hard disk 14, for example, using the files stored in the USB memory 21 prior to the other, or in a case where these files do not exist in one of these locations, using a file that exists in the other, is also acceptable as a configuration of the present invention.

In addition, such a configuration may be as storing in the USB memory 21 a program to convert the contents of the prescribed type of files to one written in Page Description Language, and by booting this program in the image forming apparatus 10, an affirmative determination is made in step S9.

Next, in the above second embodiment, the situation in which only PDF files could be printed was described, but it is sufficient if there is a type of files which can be printed by the image forming apparatus.

Also, in the partition list automatic printing section 45, it is sufficient if the number of characters of the filenames to be displayed is obtained substantially; for example, the configuration that obtains the number of missing characters from the LCD display panel 190 is also included in the present invention.

Furthermore, in each of the above embodiments, using a hard disk card or other removable memory device such as an SD card (Secure Digital Memory Card) instead of the USB memory is also acceptable as a configuration of the present invention.

What is claimed:

1. An image forming apparatus, comprising: a processor; memory means, coupled to the processor, into which a program is stored; coupling means to which a removable memory device is coupled; a removable memory device interface coupled between the coupling means and the processor; a control section, coupled to the processor, including instruction input means and display means; and an image formation means for forming an image on a sheet of paper on the basis of supplied print data; wherein the program causes the processor:

(a) if the removable memory device is coupled to the coupling means, then according to an instruction input from the instruction input means, to display the names of a prescribed type of files stored in the removable memory device, together with their identification codes added to the beginning of the names, within the number of characters that can be displayed in one row on the display means;

(b) according to an instruction input from the instruction input means, to provide data including the names of the prescribed type of files stored in the removable memory device and their identification codes, to the image formation means to print a file list on a sheet of paper; and (c) to read the contents of a file selected by an instruction input from the instruction input means, to convert the contents into print data, and to provide the print data to the image formation means;

wherein the display width of the display means is shorter than a printable width of a horizontal scanning direction;

wherein the program further causes the processor:

to obtain the number of characters substantially for each of the names of the files to be displayed in the step (a);

to count the number of files where the number of characters of their filenames exceed a first threshold value; and if the counted number exceeds a second threshold value, to provide data including the names of the prescribed type of files stored in the removable memory device and their identification codes, to the image formation means to print a file list on a sheet of paper.

2. The image forming apparatus according to claim 1, wherein the first threshold value and the second threshold value can be set.

* * * * *